Oct. 20, 1959 H. E. SMITH 2,909,273

EXTENSIBLE CONVEYORS

Filed Dec. 11, 1957 2 Sheets-Sheet 1

INVENTOR.
Herman E. Smith
BY
Murray A. Gleeson
ATTORNEY

Oct. 20, 1959 H. E. SMITH 2,909,273

EXTENSIBLE CONVEYORS

Filed Dec. 11, 1957 2 Sheets-Sheet 2

46
48
56
47
49
53
52
51
59
27
57
58

INVENTOR.
Herman E. Smith

BY
Murray A. Gleeson
ATTORNEY

United States Patent Office 2,909,273

Patented Oct. 20, 1959

2,909,273

EXTENSIBLE CONVEYORS

Herman E. Smith, Park Forest, Ill., assignor to Goodman Manufacturing Company, Chicago, Ill., a corporation of Illinois Application December 11, 1957, Serial No. 702,183

6 Claims. (Cl. 198—202)

This invention relates generally to extensible belt conveyors, and particularly to improvements in the tail section of such conveyor whereby the return reach can be raised thereat for the placing of a support stand for the rope side frames, and for correcting the misalignment of the return reach.

In the continuous mining of coal or other mineral, an extensible belt conveyor is arranged to follow the advance of a continuous miner. As the tail section advances it is necessary to place an additional support stand for the rope strands supporting the troughing roller assemblies and the conveying reach.

Ordinarily the operator and his helper are required to clear a sufficient area underneath the return reach in order to insert the new stand and roller for supporting both the conveying and return reaches. It is difficult to place the stand especially in cases where the inby end of the tail section is tilted upward from a fault in the floor or as a result of running upon a piece of timber. This situation arises by reason of the long overhang of the outby end of the tail section, which results in the return reach being too close to the floor for ready placement of the new support stand.

Furthermore, even if none of the aforesaid conditions occurs and there is enough room to insert the stand, the operator is required to push and heave on the stand to place the same in position whilst working in the dark, all the while being in a dangerous position close to the belt which travels at a speed of from three to five hundred feet per minute. The belt splices, which may be ragged, occur every fifty to one hundred feet, and the operator has to work rapidly and with much dexterity to avoid catching his clothing on the splices which pass him about every twelve seconds.

Another problem attendant upon the operation of belt conveyors is that of belt alignment. If one of the stands supporting the idler roller for the return reach becomes skewed with respect to the longitudinal center line of the return reach, the reach will run off-center. When the reach is reversed in direction in the tail section at the return idler pulley the off-center condition of the belt results in the conveying reach being loaded off-center thereby causing the conveying reach to load itself along a new center line. This combination of the skewed return idler roller and the off-center loading tends to compound itself, at times causing the conveying reach to spill its contents off to one side thereof.

With the foregoing considerations in mind it is a principal object of this invention to enable the operator of an extensible conveyor to place a support stand for the return reach in position close to the outby end of the tail section.

Another object of the invention is to provide a construction whereby the return reach may be elevated adjacent to the tail section, and whereby the misalignment of the return reach may be readily corrected.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefit of the teachings herein and such other embodiments are intended to be reserved especially as they fall within the scope and spirit of the subjoined claims.

Figure 1:
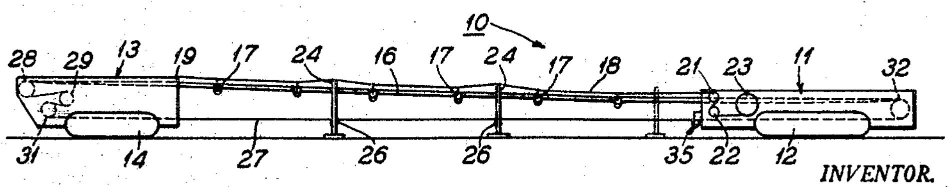
Fig. 1 is a side elevational view of an extensible belt conveyor having the improvements according to the present invention embodied in the tail section thereof.

Referring now to Fig. 1 of the drawings, the improvements according to the present invention are embodied in an extensible conveyor indicated generally by the reference numeral 10 and including a tail section 11 mounted for movement upon crawler treads 12 and a head section 13 mounted for movement upon crawler treads 14. The conveyor seen in Fig. 1 is of the type where a conveying reach 16 thereof is supported upon troughing roller assemblies indicated generally by the reference numeral 17 and extending between a pair of laterally spaced rope strands 18. The rope strands 18 are anchored at 19 to the head section 13 and reeved about a pair of idler pulleys 21 and 22 at the tail section 11, the rope strands being stored upon a winding drum 23 thereat.

Support stands indicated generally by the reference numeral 24 are spaced at intervals throughout the length of the rope strands 18 and support the same between the head section 13 and the tail section 11, each support stand 24 including an idler roller 26 for supporting a return reach 27 of the endless belt shown.

The conveying reach 16 is reversed in direction about an idler pulley 28 at the head section 13 and driven by snubbing rollers 29 and 31, the return reach 27 being reversed in direction at the tail section 11 at an idler pulley 32. A belt storage loop, not shown, is provided at the head section 13 whereby the endless belt can be extended or contracted and the storage drum 23 is arranged to pay out or wind in rope strand 18 in accordance with the change in length of the conveyor 10. Details of construction of such an extensible conveyor may be as shown in more detail in an application of Bergmann et al., Serial No. 657,952, filed May 8, 1957, for Improvements in Extensible Belt Conveyors.

The tail section 11 may leave between the crawler treads 12 thereof a windrow of slack, not shown, which makes it difficult to place the support stand 24 immediately outby of the tail section 11. Means indicated generally by the reference numeral 35 are accordingly provided to raise the return reach 27 to the phantom line position seen in Fig. 2, thus making it a great deal easier for the operator to place the support 24.

Figure 3:
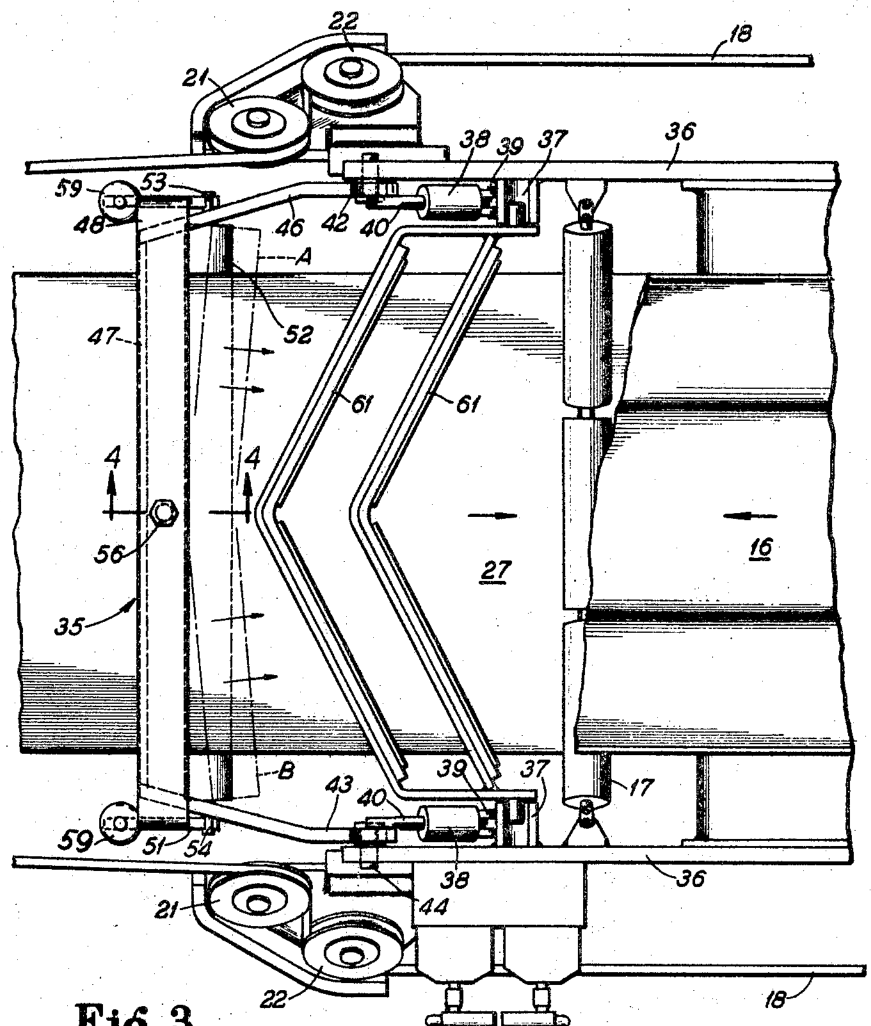
Fig. 3 is a plan view of the tail section seen in Fig. 2, showing further details of the improvements according to the present invention.

The tail section 11 is provided with spaced side frames 36, see also Fig. 3, which in turn support mounting brackets 37 for hydraulic cylinders 38 pivotally mounted to each bracket 37 by a clevis 39. Each cylinder 38 has a piston rod 40 pivotally connected at a lost-motion connection 41 to an arm 42 of a bell crank 43 pivotally mounted on a pin 44 extending inward of each of the side frame 36.

Bell crank 43 has an arm 46 which extends beyond the outby end of the tail section 11, the spaced arms 46 being spanned by an angle shaped member 47.

A substantially T-shaped supporting bracket 48 has a downward extending arm 49 at each end thereof, which is continuous with a horizontal extending portion 51. A roller 52 turning upon an idler shaft 53 is supported at its shaft ends which rest in a slot 54 on each horizontally extending portion 51.

Figures 2, 4:
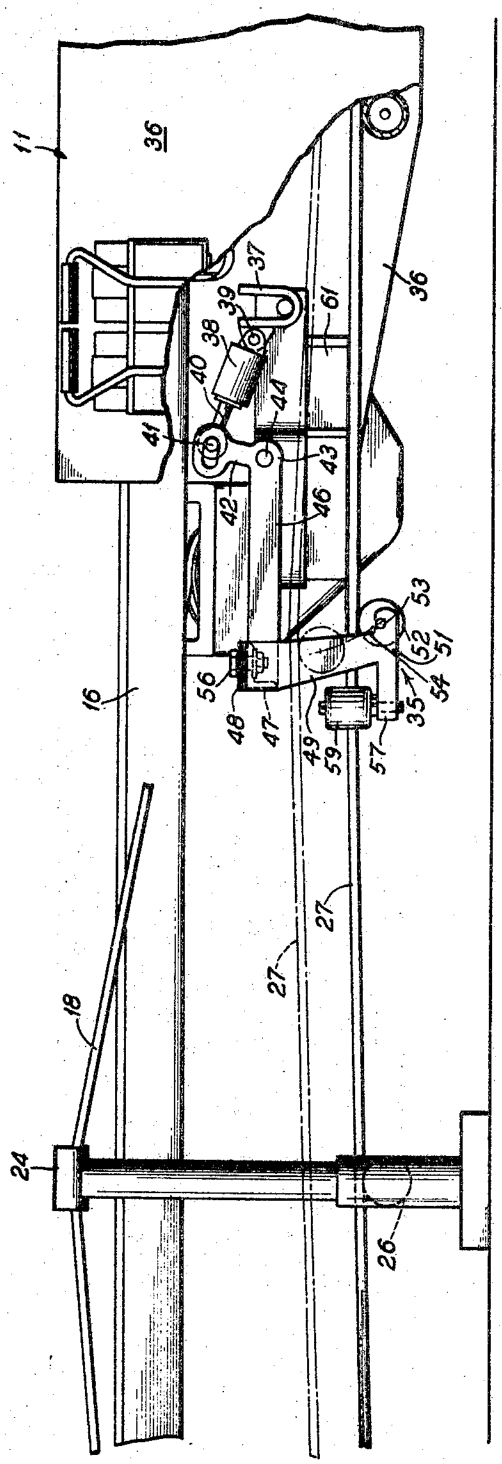
Fig. 2 is an enlarged side elevational view of the tail section of the conveyor seen in Fig. 1 showing details of the present invention incorporated therein.
Fig. 4 is a transverse sectional view taken along the line 4—4 of Fig. 3.

The two hydraulic cylinders 38 are connected in a hydraulic circuit, not shown, whereby they will be caused to rock the bell cranks 43 about the stub pins 44 to raise the roller 52 supported by the arms 49 and thereby raise the return reach 27 as seen in Fig. 2.

When the return reach 27 is raised in the manner described it becomes a great deal easier for the operator to clear the windrow beneath the return reach 27 so that the stand 24 can be placed in position as seen in Fig. 2. After being thusly placed the cylinders 38 can be actuated to lower the roller 52 so that the return reach 27 will be supported on the idler roller 26 at the support 24.

Means are also provided for correcting the misalignment of the return reach 27, and to this end the supporting bracket 48 has a pivotal connection with respect to the angle 47 by the pin 56. Each end of the horizontal extending portion 51 of the arms 49 terminates in a cylindrical shaped support 57 adapted to receive a shaft 58 supporting an aligning roller 59. When the return reach 27 is misaligned it will contact one or the other of the aligning rollers or bumpers 59. When the aligning roller 59 contacts the edge of the return reach 27, the motion of the belt will apply to the bracket 48 and the arms 49 a force component turning the support 48 about the axis of pin 56, until the roller 52 adopts a position A as seen in Fig. 3. This skewed position of the roller 52 will apply a corrective component of force to the return reach 27 to recenter the same. Conversely, contact of the other edge of the return reach 27 with the other aligning roller 59 will cause the roller 52 to adopt the position B to apply to the return reach a corrective component of force as indicated by the arrows and thereby realign the same.

The brackets 37 supporting the actuating cylinders 38 are also arranged to support a pair of chevron-shaped sweeps 61, which clean the return reach 27 before it change in direction at the idler pulley 32 of the tail section 11.

It will be seen by the foregoing description that there has been provided a new and useful improvement in the art of extensible conveyors. The improvement makes it possible not only to raise the conveying reach near the tail section of the coveyor to facilitate the placing of the support stands, but also makes it possible to correct the misalignment of the return reach at such tail section.

While the invention has been described in terms of a preferred embodiment thereof its scope is intended to be limited only by the claims here appended.

I claim as my invention:

1. In an extensible belt conveyor, and in combination therewith, a tail section having a belt reversing pulley therein, a conveyor belt having a return reach being movable into said tail section toward said pulley and being trained about said pulley for movement out of said tail section, a series of idlers disposed at intervals behind said tail section and engaging said return reach to support said reach above the ground, said tail section being movable forward and backward to vary the effective length of said conveyor and means for correspondingly varying the effective length of said belt, a vertically movable lifting member carried by said tail section and disposed beneath said return reach, means carried by said tail section and being operable to move said lifting member between predetermined upper and lower positions, said lifting member being effective in its said upper position to hold said return reach above and out of engagement with an idler adjacent said tail section to facilitate emplacement and removal of such adjacent idler, and said lifting member being effective in its said lower position to enable said return reach to bear on and be guided by said adjacent idler.

2. The combination, with a tail section of an endless belt conveyor, of means for correcting the misalignment of a return reach of said endless belt conveyor, said means comprising an arm supported by said tail section on each side of said return reach, a support extending between said arms, a frame pivotally connected to said support, a roller mounted on said frame adapted to contact the underside of said return reach, a pair of bumpers on said frame disposed outwardly thereof adjacent opposite edges of said return reach, one of said bumpers being adapted to contact an edge of said return reach upon misalignment thereof in a direction toward said one bumper, said frame pivoting with its roller during such contact in a direction to place an alignment correcting force on said return reach, and means for raising said arms into position for contact of said roller with said return reach.

3. In an extensible belt conveyor, and in combination therewith, a tail section having a belt reversing pulley therein, a conveyor belt having a return reach being movable into said tail section toward said pulley and being trained about said pulley for movement out of said tail section, a series of idlers disposed at intervals behind said tail section and engaging said return reach to support said reach above the ground, said tail section being movable forward and backward to vary the effective length of said conveyor and means for correspondingly varying the effective length of said belt, a vertically movable lifting member carried by said tail section, a frame pivotally connected to said lifting member, a roller mounted on said frame adapted to contact the underside of said return reach, a pair of bumpers on said frame disposed outwardly adjacent opposite edges of said return reach, one of said bumpers adapted to contact an edge of said return reach upon misalignment thereof in a direction toward said one bumper, said frame pivoting with its roller during such contact in a direction to place an alignment correcting force on said return reach, said lifting member being effective in some of its vertical positions to hold said return reach above and out of engagement with an idler adjacent said tail section to facilitate emplacement and removal of such adjacent idler.

4. In an extensible belt conveyor, and in combination therewith, a tail section having a belt reversing pulley therein, a conveyor belt having a return reach being movable into said tail section toward said pulley and being trained about said pulley for movement out of said tail section, a series of idlers disposed at intervals behind said tail section and engaging said return reach to support said reach above the ground, said tail section being movable forward and backward to vary the effective length of said conveyor and means for correspondingly varying the effective length of said belt, a pair of arms carried by said tail section spaced outwardly of the edges of said return reach, a roller supported on said arms and disposed beneath said return reach, power means carried by said tail section effective to raise a portion of said arms on which said roller is supported, said power means being operable to move said rcller between predetermined upper and lower positions, said roller being effective in its said upper position to hold said return reach above and out of engagement with an idler adjacent said tail section to facilitate emplacement and removal of such adjacent idler, and said roller being effective in its said lower position to enable said return reach to bear on and be guided by said adjacent idler.

5. The combination, with a tail section of an endless belt conveyor, of means for correcting the misalignment of a return reach of said endless belt conveyor, said means comprising an arm supported by said tail section on each side of said return reach, a support extending between said arms, a frame pivotally connected to said support, a roller mounted on said frame adapted to engage the underside of said return reach, a pair of aligning rollers supported on said frame disposed outwardly thereof adjacent opposite edges of said return reach, one of said aligning rollers being adapted to engage a corresponding edge of said return reach upon misalignment thereof in a direction toward said one aligning roller, said frame pivoting with its roller during such engagement in a direction to place an alignment correcting force on said return reach, and power means on said frame connected to one of said arms for raising said arms into position for engagement of said roller with said return reach.

6. In an extensible belt conveyor, and in combination therewith, a tail section having a belt reversing pulley therein, a conveyor belt having a return reach being movable into said tail section toward said pulley and being trained about said pulley for movement out of said tail section, a series of idlers disposed at intervals behind said tail section and engaging said return reach to support said reach above the ground, said tail section being movable forward and backward to vary the effective length of said conveyor and means for correspondingly varying the effective length of said belt, a pair of transversely aligned horizontally extending arms pivotally mounted on said tail section one disposed at each side of said return reach, a support extending between said arms, a frame supported on a pivotal mount on said support, a roller mounted on said frame adapted to contact the underside of said return reach, a pair of aligning rolls on said frame disposed outwardly of and adjacent opposite edges of said return reach and on said pivotal mount opposite said tail section, one of said aligning rollers adapted to contact an edge of said return reach upon misalignment thereof in a direction toward said one aligning roller, said frame pivoting with its roller during such contact in a direction to place an alignment correcting force on said return reach, and power means on said tail section connected to one of said arms for lifting said roller between predetermined upper and lower positions, said roller being effective in its said upper position to hold said return reach above and out of engagement with an idler adjacent said tail section to facilitate emplacement and removal of such adjacent idler.

References Cited in the file of this patent

UNITED STATES PATENTS

| | | |
|---|---|---|
| 889,342 | Snyder | June 2, 1908 |
| 2,751,067 | Nicholson | June 19, 1956 |

FOREIGN PATENTS

| | | |
|---|---|---|
| 26,967 | Australia | May 28, 1931 |
| 479,789 | Canada | Dec. 25, 1951 |